United States Patent [19]

Chuniaud et al.

[11] Patent Number: 5,333,132
[45] Date of Patent: Jul. 26, 1994

[54] CONNECTING APPARATUS FOR PLURAL CHANNEL DIGITAL COMMUNICATION NETWORK

[75] Inventors: Rene Chuniaud, Cagnes sur Mer; Marc Lamberton, Antibes; Jean-Francois Le Pennec, Nice; Patrick Michel, La Guade; Patrick Sicsic, La Colle sur Loup, all of France

[73] Assignee: International Business Machines Corporation, Armonk, N.Y.

[21] Appl. No.: 925,065

[22] Filed: Aug. 5, 1992

[30] Foreign Application Priority Data

Aug. 29, 1991 [EP] European Pat. Off. ........ 91480136.0

[51] Int. Cl.⁵ .............................................. H04L 5/02
[52] U.S. Cl. .................. 370/58.1; 370/108; 370/110.1; 379/94
[58] Field of Search ............... 370/58.1, 58.2, 79, 370/84, 108, 110.1; 379/93, 94, 100, 209

[56] References Cited

U.S. PATENT DOCUMENTS 4,998,243 3/1991 Kao .................. 370/110.1 X
5,093,855 3/1992 Vollert et al. ........... 370/110.1 X

FOREIGN PATENT DOCUMENTS 0119843 9/1984 European Pat. Off. .
0173274 3/1986 European Pat. Off. .
3726359 2/1989 Fed. Rep. of Germany .
2634082 1/1990 France .

OTHER PUBLICATIONS

Nachrichten Elektronik und Telematik. vol. 43, No. 6, Jun. 1989, Heidelberg De, pp. 268-272, by R. Paykowski, "Datenkommunikation Uber Digitale Nebenstellenanlagen".
International Switching Symposium 1984, Session 22B, Paper 5, May 7, 1985, Florence, IT by W. Staudinger, "A 64bit/s Model Network as a First ISDN Approach".

Primary Examiner—Benedict V. Safourek
Assistant Examiner—Melvin Marcelo
Attorney, Agent, or Firm—John J. Timar

[57] ABSTRACT

An apparatus for connecting a data communication equipment, such as a data terminating equipment (DTE) to an ISDN digital communication network providing a first 64 kbps and a second 64 kbps B digital communication channel which involve different transmission delays. The apparatus includes a transmit part with a separation for separating a unique high rate 128 kbps data flow into two distinctive 64 kbps data flows to be transmitted through both B channels. The apparatus includes a receive part (9999) including storage for storing the data received from digital network, measurement and comparison circuits for measuring the difference between the two transmission delays, address generators for addressing the storage in order to extract the data received through both digital channels, control circuits responsive to the measure and comparison for controlling the address generators in order to provide a 128 kbps which is not affected by the difference of transmission delays introduced by both digital channels. The invention is particularly well suited for transmitting simultaneously multi-media data, i.e. voice, video and data.

7 Claims, 11 Drawing Sheets

FIG.4: DMA Control State Machine

FIG.5A  STATE 2

FIG.5B  STATE 4

FIG.6

CONNECTING APPARATUS FOR PLURAL CHANNEL DIGITAL COMMUNICATION NETWORK

TECHNICAL FIELD OF THE INVENTION

The invention relates generally to communication systems, and particularly to an apparatus for connecting communication equipment to a digital communication network, having at least a first and a second digital communication channel involving different transmission delays.

BACKGROUND ART

The implementation of digital networks, more precisely Private Circuit Switching Networks such as Integrated Service Digital Networks (ISDN), began in the early sixties with the process of digitization of telephone networks in different countries replacing the earlier analogue technologies.

CCITT Recommendations provide principles and guidelines on the ISDN concept and ISDN standards, and also detailed specifications of the user-network and inter-network interfaces.

CCITT Recommendation I. 430 defines layer-1 characteristics of the user-network interface to be applied at the S or T reference points for the basic interface structure. ISDN basic access provides a 144 kb/s transmission channel, which is divided into three distinct sub-channels by means of a Time Division Multiplex mechanism: two so-called B channels and a single D channel. Each of the B channels is an independent 64 kbps duplex bearer channel with bit and octet timing, which can be used for a digital telephone communication (the Pulse Code Modulation [PCM] is performed by the subscriber equipment) or for a 64 kbps data communication. The D channel is a 16 kbps channel which allows dynamic multiplexing of the following information: signalling information relative to the B-channels, information relative to low rate teleservices, and information using low rate Packet Switching services (from 16 to 9600 bps).

Although a 64 kbps B channel is sufficient for a wide variety of data communication applications, particularly those using conventional data terminating equipment interfaces such as described in CCITT recommendations V24, V35, and X21, a higher transmission rate through one ISDN network may appear desirable. For instance, in multimedia applications where data, voice and images are simultaneously transmitted, the user may wish to have a 128 kbps channel.

Known ISDN equipment does not allow the use of both independent B channels in order to provide a full 128 kbps data communication channel, since both B channels operate independently and asynchronously. Indeed, although the position of one bit in a byte is maintained through the ISDN transmission network, the transmission time of that byte in the network can largely vary from one B channel to the other, thus preventing their synchronization.

OBJECT OF INVENTION

The problem to be solved as an object of the present invention is to provide a terminal adapter which enables use of both B channels as a unique fully synchronized 128 kbps data communication channel.

BRIEF SUMMARY OF THE INVENTION

This problem is solved by apparatus for connecting equipment to a digital communication network having at least first and second digital communication channels involving different transmission delays. The apparatus includes a transmit part, having means for separating a unique high rate data flow (to be transmitted through the digital network) received from data communication equipment into two distinctive low rate data flows, each of which is transmitted through one of the digital channels. The apparatus also includes a receive part which has storage means for storing the data received from the digital network and means for measuring the difference between the two transmission delays. It also has addressing means for addressing the storage means in order to provide the data received through both digital channels, and control means responsive to the transmission delay difference measure for controlling the addressing means in order to provide a high-rate data flow.

In a preferred embodiment of the invention, the apparatus includes means for performing an initialization procedure to assure the data communicating equipment that both of said first and second digital channels are operational, and that the high rate data flow can therefore be transmitted through both digital channels.

Preferably, the apparatus includes timing means for ensuring that the establishment of at least two channels is achieved within a predetermined period, and means for disconnecting an already established digital channel in the case where the other digital channel cannot be established within that period. This feature results in quick disconnection of the apparatus if the latter is not allocated both requisite digital channels by the digital network.

In a preferred embodiment of the invention, the apparatus includes overflow detecting means for disconnecting the digital channel connection in case an overflow of said storage means is detected so that a possible loss of data is immediately processed.

Preferably, the apparatus consists of a terminal adapter for an ISDN network allowing the establishment of a fully synchronized 128 kbps data communication and further including means for performing a time division multiplexing process on the 128 kbps data in order to provide a set of different digital channels, having adaptable data transmission rates for simultaneously transmitting data, video and voice. The invention is thus particularly well suited for multi-media applications.

DETAILED DESCRIPTION OF A PREFERRED EMBODIMENT OF THE INVENTION

Figure 1A:
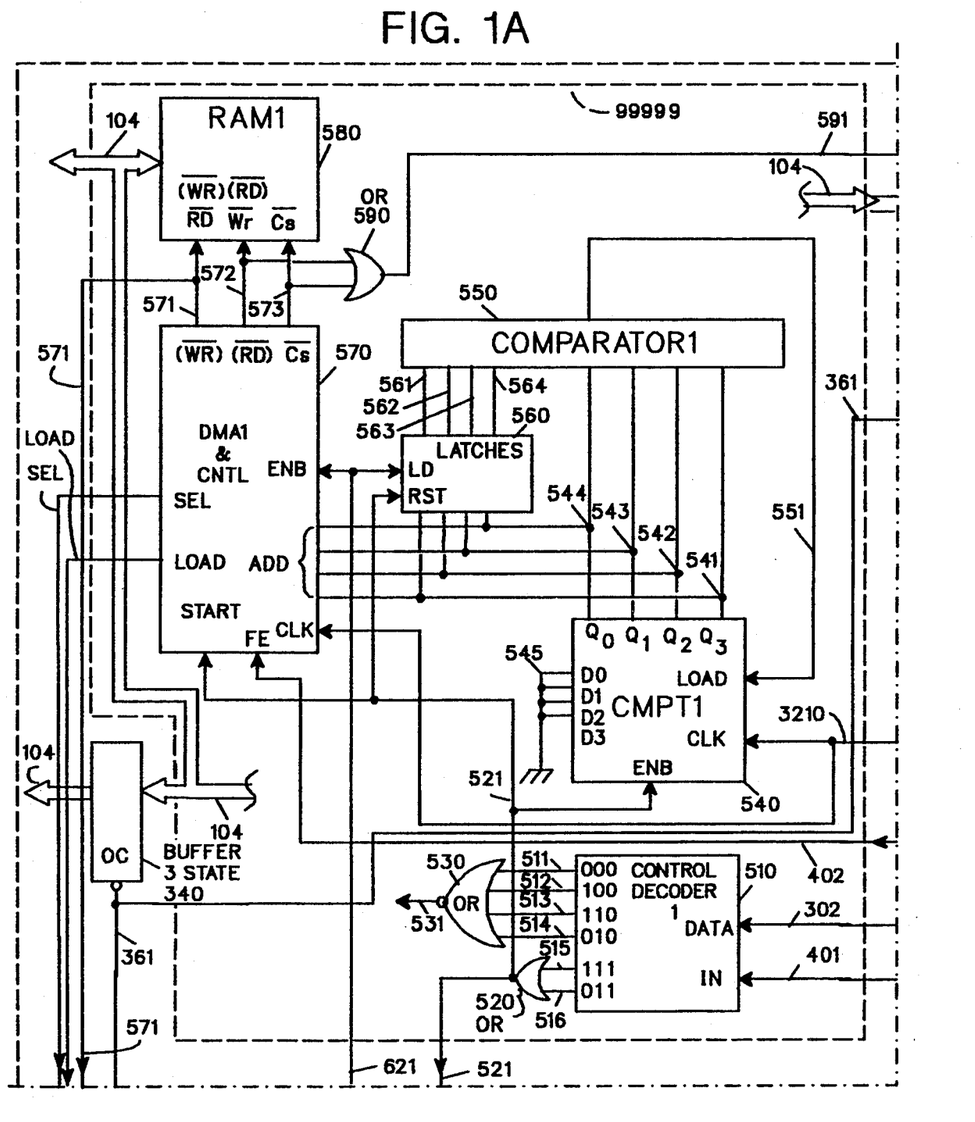
FIGS. 1a, 1b, 1c, 1d, 1e, and 1f illustrate a preferred embodiment of the receive part of the terminal adapter in accordance with the present invention.
Figure 1B:
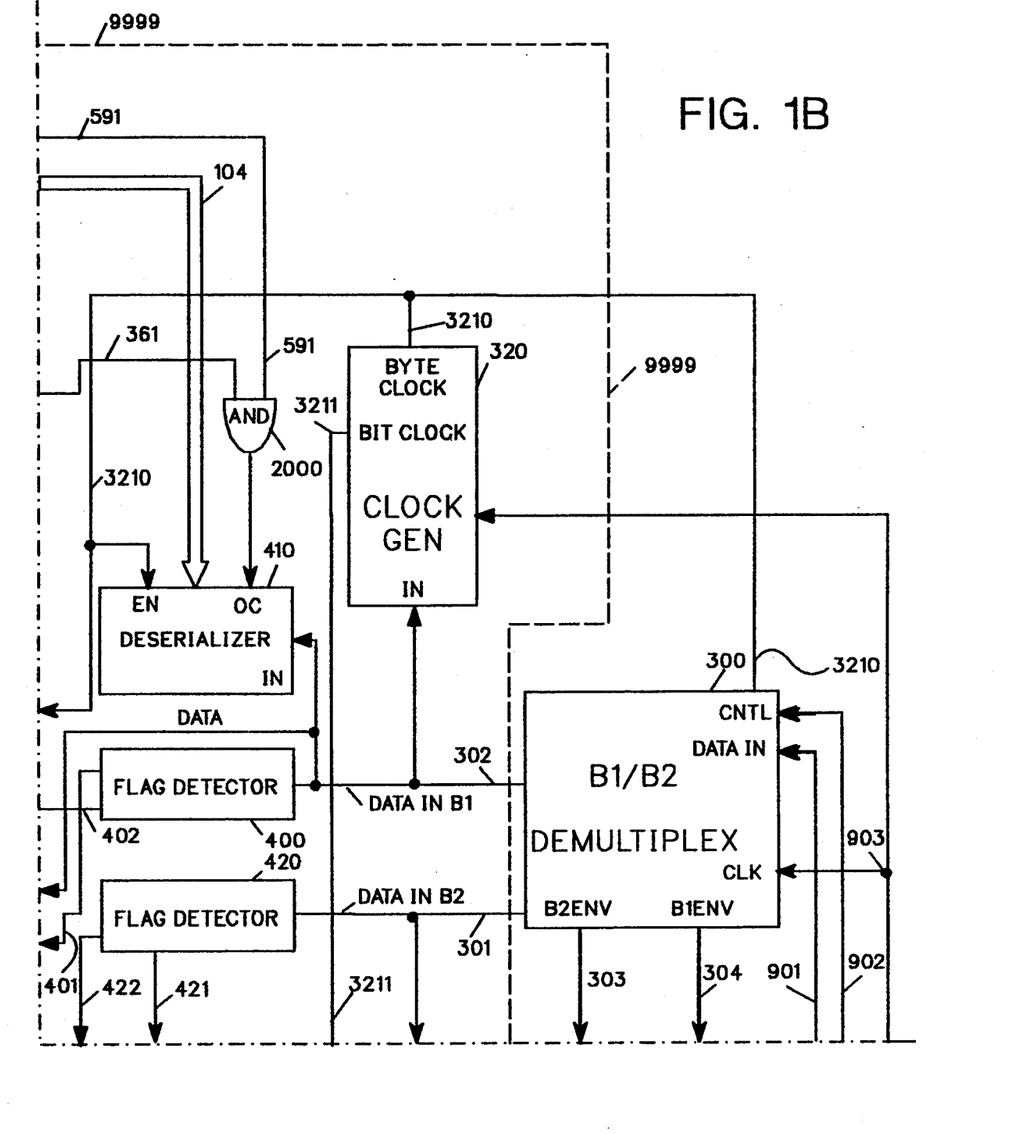
Figure 1C:
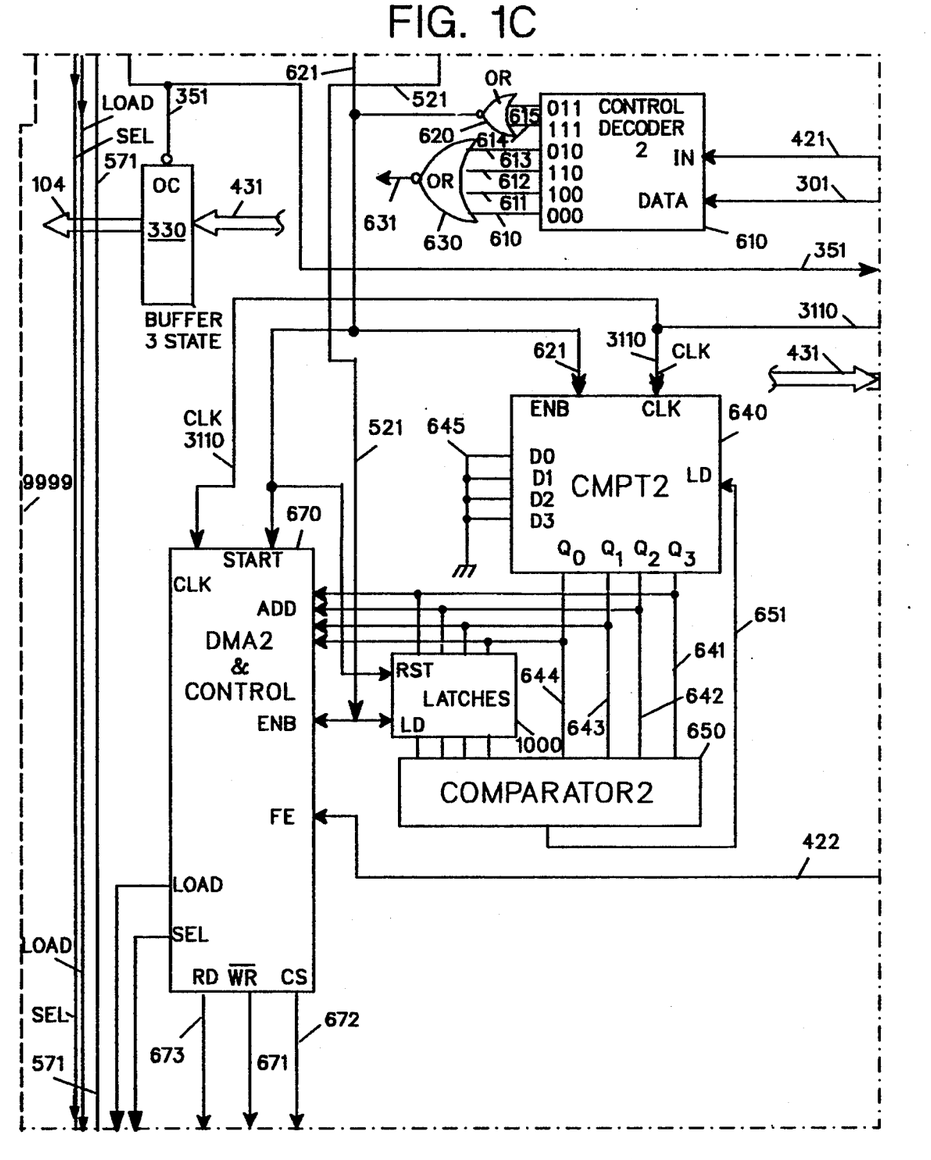
Figure 1D:
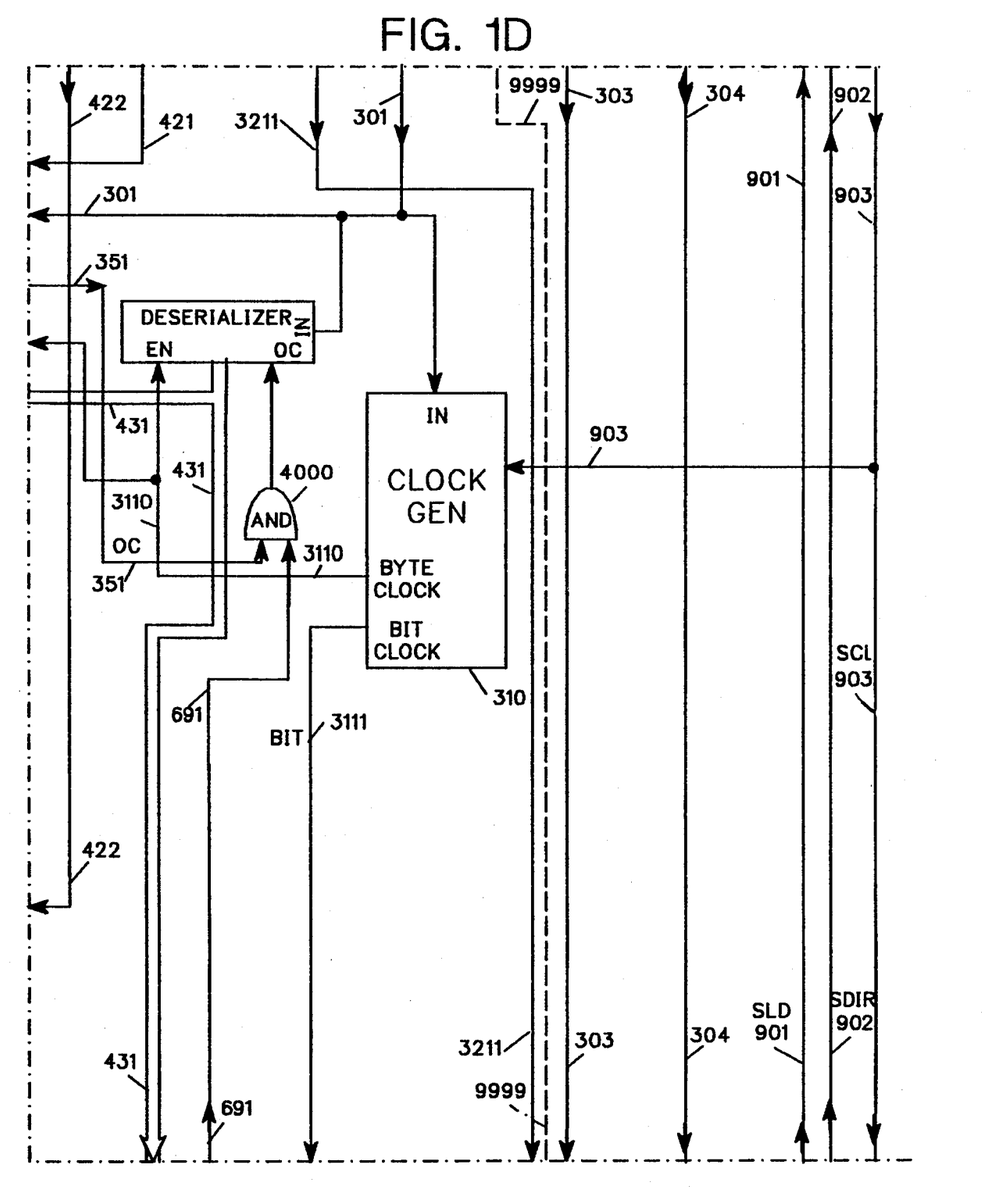
Figure 1E:
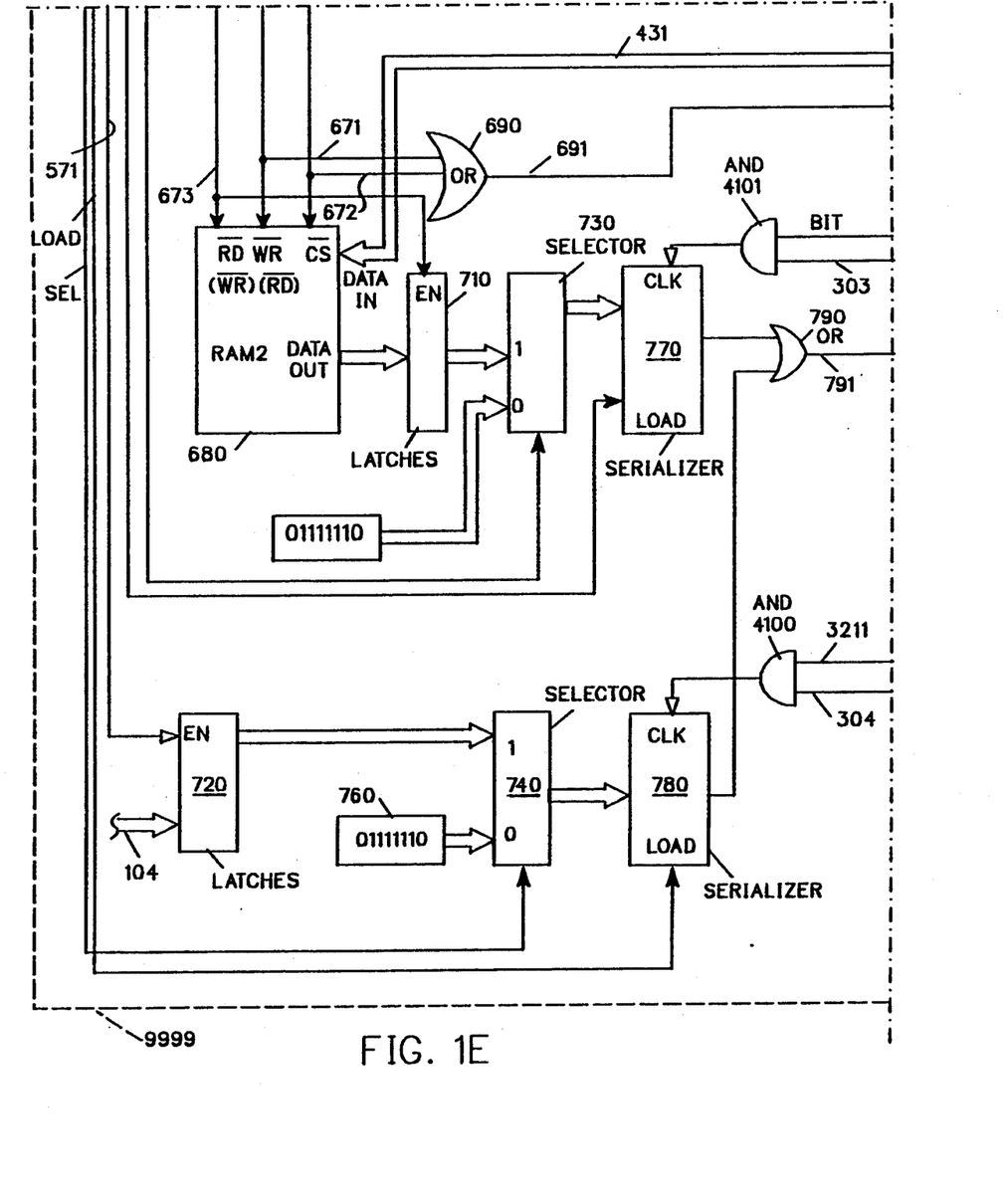
Figure 1F:
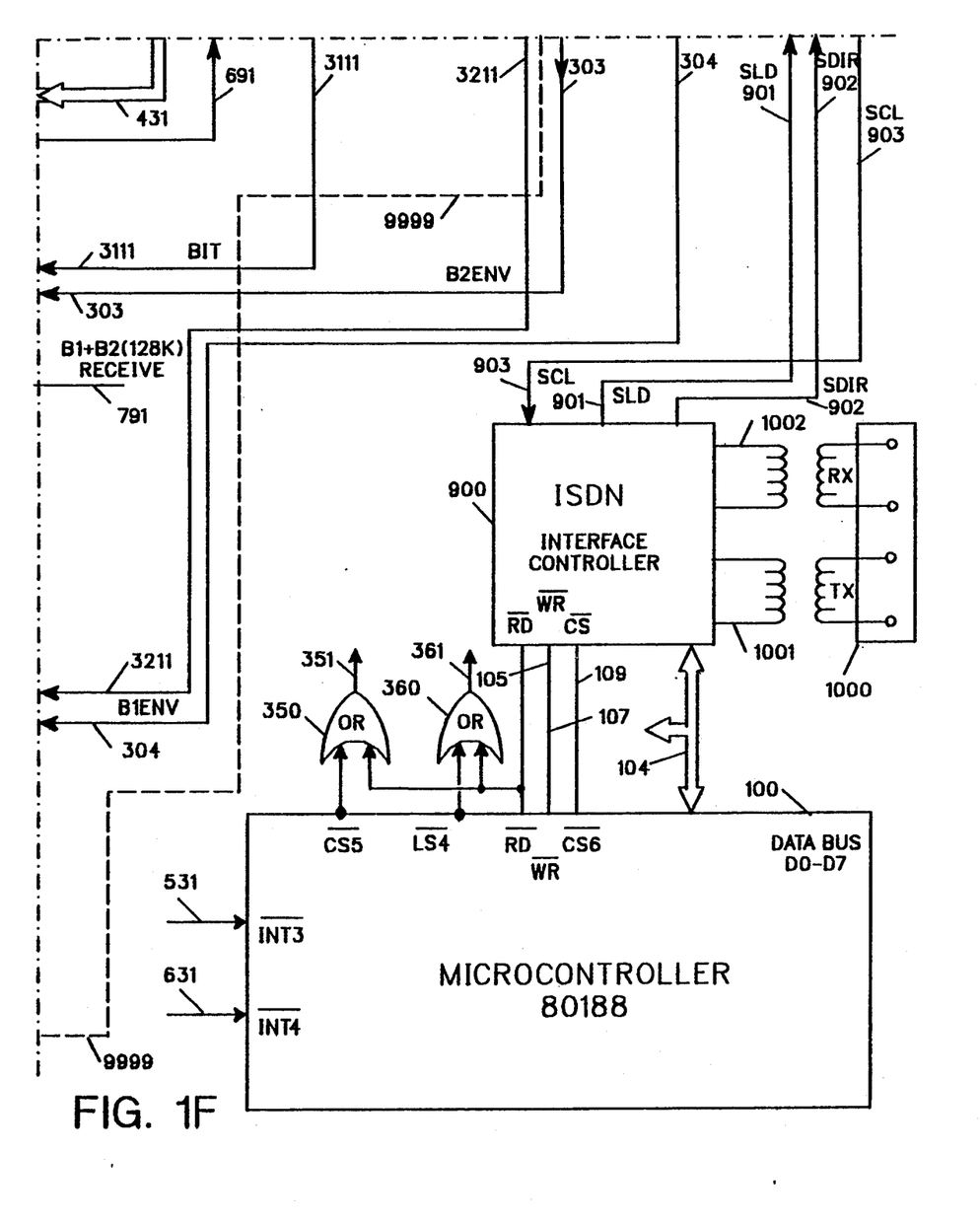
Figure 2:
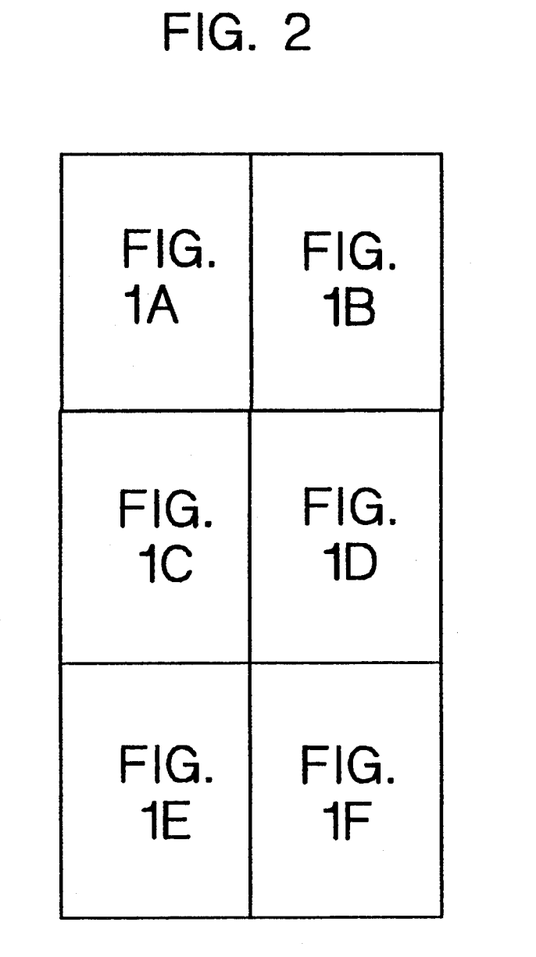
FIG. 2 illustrates the arrangement of FIGS. 1a, 1b, 1c, 1d, 1e and 1f in order to provide a fully illustrative drawing of the receive part of the terminal adapter according to the invention.

With respect to FIGS. 1a, 1b, 1c, 1d, 1e, and 1f arranged as shown in FIG. 2, there is illustrated the receiving part of the adapter in accordance with a preferred embodiment of the present invention. The receiving part comprises a microcontroller 100, such as an INTEL 80188, which is connected to an ISDN interface controller 900. Interface controller 900 may be, for example, an INTEL iATC 29C53. Interface controller 900 is connected with microcontroller 100 by means of a data bus 104 and common READ, WRITE and CHIP SELECT control leads 107, 105 and 109. The ISDN interface controller 900 allows the transmission and reception of data through transformers 1001 and 1002, which are connected to a connector 1000 being of the type ISO 8877 in the preferred embodiment of the invention. Connector 1000 allows the connection to the SO reference point in accordance with the CCITT I 430 recommendations. Documentation relating to the INTEL iATC 29C53 communication controller can be found in INTEL Microcommunications controller Handbook, 1988, page 5-76 (reference 231658-003).

Controller 900 also communicates with a demultiplexing circuit 300 by means of a set of three leads: a Subscriber Line Data (SLD) link 901, carrying the data which are transmitted on both B channels, a Subscriber clock (SCL) lead 903, carrying a 512 kHz bit clock which is connected to a clock input of demultiplexing circuit 300, and a Subscriber Direction (SDIR) lead 902 indicating the direction of the data flow on SLD bus. The signals carried by the latter leads are particularly described in the above cited document. SDIR lead 902 carries a signal which is used for controlling the demultiplexing circuit 300.

Demultiplexing circuit 300 provides, first, the extraction of two B channels from SLD lead 901—that is to say, it separates the data existing in the data flow on SLD lead 901 in order to provide two distinctive data flows, each of 64 kbps, on a set of two leads, B1 DATA IN lead 302 and B2 DATA IN lead 301. Demultiplexing circuit 300 also provides B1 and B2 envelope signals on leads 304 and 303. The B1 DATA IN lead 302 is transmitted to an input lead of a clock generator 320 and also to the input of a flag detector 400.

Clock generator circuit 320 also receives the SCL clock on lead 903 and provides two clocking signals: first, a byte clocking signal on a lead 3210, which is transmitted to a clock input of a counter 540, to the enable input of a deserializer 410, and to a clock input of a DMA1 CONTROL circuit 570; and second, a bit clocking signal on a lead 3211 which is transmitted to a first input lead of an AND gate 4100. The generation of byte clocking and bit clocking signals is provided by using a set of dividing circuits well known by those skilled in the art.

Flag detector 400 is first used to detect the occurrence of the SDLC frame opening flag and to generate, upon the latter occurrence, a control pulse on a lead 401 which is transmitted to an input lead of CONTROL DECODER 1 circuit 510; secondly, flag detector 400 is used to detect the occurrence of the SDLC frame ending flag, and then to generate a second control pulse on a lead 402, which is transmitted to an FLAG END (FE) lead of DMA1 CONTROL circuit 570. The concept of frame opening and closing flags is well known to those skilled in the art of Serial Data Link Control procedures.

The output lead 401 of flag detector 400 is used to synchronize a decoding and control circuit 510 receiving the data flow existing on the DATA IN B1 channel at its data input. The decoding process of the three bits which immediately follow an opening flag results in the occurrence of a pulse appearing on one among a set of 6 output leads 511-516 according to the value of the three bits.

More particularly, lead 511 carries a pulse when detector 510 detects the occurrence of the pattern 000 just after the SDLC opening flag. Lead 512 carries a pulse when detector 510 detects the occurrence of the pattern 100 just after the SDLC opening flag. Lead 513 carries a pulse when detector 510 detects the occurrence of the pattern 110 just after the SDLC opening flag. Lead 514 carries a pulse when detector 510 detects the occurrence of the pattern 010 just after the SDLC opening flag. Lead 515 carries a pulse when detector 510 detects the occurrence of the pattern 111 just after the SDLC opening flag. Finally, Lead 516 carries a pulse when detector 510 detects the occurrence of the pattern 011 just after the SDLC opening flag.

Leads 511-514 are, respectively, connected to the four input leads of NOR gate 530, whose output 531 is used for generating an interrupt signal which is transmitted to an INT3 input of microcontroller 100. Leads 515 and 516 are, respectively, connected to the two input leads of NOR gate 520, the output of which generates a synchronization control signal on a lead 521, which is transmitted to the Enable input of a (74163-like) counter 540, to the enable input of a DMA2 CONTROL circuit 670, to the start input of DMA1 CONTROL circuit 570, and finally, to the clock input of a four-input D-type latch 1000.

Counter 540 has four output leads 541-544 which are connected to a first four-bit input bus of a comparator 550, to the input of a four-latch circuit 560 and to the four address inputs of a DMA1 CONTROL circuit 570.

Four-latch circuit 560 has four output leads 561-564 which are connected to a second four-bit input bus of comparator 550. Comparator 550 has an output lead 551 which is connected to the load input of counter 540.

The output of demultiplexing circuit 300 is connected to the serial input of a 8-bit deserializer 410. Deserializer 410 can be easily embodied by means of an 8-bit deserializer of the type 74164 and also an octal D-type latch circuit such as a type 74373. Deserializer 410 has an 8-bit output bus 411 which is connected to the input of a tri-state 8-bit buffer 340, which output bus is connected to the data bus 104 of microcontroller 100 and also to the data bus of a RAM storage 580 and to an input bus of an octal D-type latch 720.

RAM storage 580 has also common control leads such as a READ control lead 572 which is connected to the WRITE control lead 572 of DMA1 CONTROL circuit 570, a WRITE control lead 571 which is connected to the READ control lead of DMA1 CONTROL circuit 570 and also to the enable input of 8-bit D-type latch 520. The chip select lead 573 of RAM storage 580 is connected to a chip select lead of DMA1 CONTROL circuit 570. Finally, RAM storage 580 has an address bus (not shown) which is connected to the address bus 541-544 of DMA1 CONTROL circuit 570.

It should be noted that, for clarity of description, the number of bits of the address bus of the DMA1 circuit has been fixed at four, although any other number of bits could be permitted.

Chip select lead 573 and WRITE control lead 572 are, respectively, connected to the inputs of an OR gate 590, whose output lead 591 is connected to a first input lead of an AND gate 2000.

AND gate 2000 has an output lead which is connected to an OUTPUT CONTROL lead of deserializer 410, the latter control lead corresponding to the OUTPUT CONTROL lead of circuit 74373 which is included in the deserializer.

Microcontroller 100 has a set of programmable chip select leads which are used in the preferred embodiment for the transmit and receive part of the terminal adapter. In particular, microcontroller 100 has a CS4 chip select lead 106 which is connected to a first input of an OR gate 360 having a second input lead 107 receiving the READ control signal 107 generated by microcontroller 100. The READ control signal 107 is transmitted to a first input of an OR gate 350. OR gate 360 has an output lead 361 which is connected to a second input of AND gate 200 and to an OUTPUT CONTROL lead of tristate buffer 340. OR gate 350 has a second input which is connected to a CS5 chip select lead 108 of microcontroller 100 and an output lead 351 which is connected to a OUTPUT CONTROL lead of a tristate buffer 330 and to a first input lead of an AND gate 4000.

The output bus of the octal D-type latch 710 is connected to the 8-bit input of a selector 730 having a second 8-bit input receiving a predetermined fixed byte corresponding to the SDLC '7E' flag. In the preferred embodiment, that predetermined byte is set by means of wired circuitry.

Selector 730 is controlled by DMA2 CONTROL circuit 670 by means of a SEL control lead. The output of selector 730 is an 8-bit bus which is connected to the parallel input of a serializer 770, whose output lead is connected to a first input of an OR gate 790. Serializer 770 has a load input which is connected to the LOAD output of DMA2 CONTROL circuit 670 and also to a clock input which receives a clock signal generated at the output of AND gate 4101.

Similarly, the B2 DATA IN lead 301 is transmitted to an input lead of a clock generator 310 and also to the input of a flag detector 420. Clock generator circuit 310 also receives the SCL clock on lead 903 and provides two clocking signals: a first byte clocking signal on a lead 3110 which is transmitted to a clock input of a counter 640 and to a clock input of a DMA2 CONTROL circuit 670; and a second bit clocking signal on a lead 3111 which is transmitted to a first input lead of an AND gate 4101. As above, the generation of byte clocking and bit clocking signals is provided by using a set of dividing circuits well known by those skilled in the art.

Flag detector 420 is used first to detect the occurrence of the SDLC frame opening flag and to generate, upon the latter occurrence, a control pulse on a lead 421 which is transmitted to an input lead of CONTROL DECODER 2 circuit 610; second detector 420 is used to detect the occurrence of the SDLC frame ending flag and then generate a second control pulse on a lead 422 which is transmitted to a FLAG END (FE) lead of DMA2 CONTROL circuit 670. The output lead of Flag detector 420 is used to synchronize a decoding and control circuit 610 which receives the data flow existing on the B2 DATA IN channel at its data input.

The decoding process of the three bits which just follows an opening flag results in the occurrence of a pulse appearing on one among a set of 6 output leads 611–616 in accordance with the value of the latter bits.

More particularly, lead 611 carries a pulse when detector 610 detects the occurrence of the pattern 000 just after the SDLC opening flag. Lead 612 carries a pulse when detector 610 detects the occurrence of the pattern 100 just after the SDLC opening flag. Lead 613 carries a pulse when detector 610 detects the occurrence of the pattern 110 just after the SDLC opening flag. Lead 614 carries a pulse when detector 610 detects the occurrence of the pattern 010 just after the SDLC opening flag. Lead 615 carries a pulse when detector 610 detects the occurrence of the pattern 111 just after the SDLC opening flag. Finally, Lead 616 carries a pulse when detector 610 detects the occurrence of the pattern 011 just after the SDLC opening flag.

Leads 611–614 are connected to the four input leads of an NOR gate 630, whose output 631 is used for generating an interrupt signal which is transmitted to an INT4 input of microcontroller 100. Leads 615 and 616 are connected to the two input leads of a NOR gate 620, the output of which generates a synchronization control signal on a lead 621 which is transmitted to the Enable input of a (74163-like) counter 640, to the enable input of DMA1 CONTROL circuit 570, to the start input of DMA2 CONTROL circuit 670, and finally, to the clock input of D-type latch 560.

Counter 640 has four output leads 641–644 which are connected to a first four-bit input bus of a comparator 650, to the input of a four-latch circuit 1000 and to the four address inputs of a DMA2 CONTROL circuit 670.

Four-latch circuit 1000 has four output leads which are connected to a second input four-bit bus of comparator 650. Comparator 650 has an output lead 651 which is connected to the load input of counter 640.

The output of demultiplexing circuit 300 is connected to the serial input of a 8-bit deserializer 430 as of the same type of deserializer 410. Deserializer 430 has an 8-bit output bus 431 which is connected to the input of a tri-state 8-bit buffer 330, whose output bus is connected to the data bus 104 of microcontroller 100. The output bus 431 is also connected to a data bus of a RAM storage 680 and to an input bus of an octal D-type latch 710.

RAM storage 680 has also common control leads such as a READ control lead 671 which is connected to the WRITE control lead of DMA2 CONTROL circuit 670, and a WRITE control lead 673 which is connected to the READ control lead of DMA2 CONTROL circuit 670 and also to the enable input of 8-bit D-type latch 710. The chip select lead 672 of RAM storage 680 is connected to a chip select lead of DMA2 CONTROL circuit 670. Finally, RAM storage 680 has an address bus (not shown) which is connected to the address bus 641–644 of DMA2 CONTROL circuit 670. Chip select lead 672 and WRITE control lead 671 are connected to the inputs of an OR gate 690, whose output 691 is connected to a first input lead of an AND gate 4000. AND gate 4000 has an output lead which is connected to an OUTPUT CONTROL lead of deserializer 430, the latter control lead corresponding to the OUTPUT CONTROL lead of circuit 74373 which is included in the deserializer. OR gate 350 has an output 351 which is connected to an OUTPUT CONTROL lead of tristate buffer 330.

The output bus of octal D-type latch 720 is connected to the 8-bit input of a selector 740 having a second 8-bit input receiving a predetermined '7E' fixed pattern. Selector 740 is controlled by DMA1 CONTROL circuit 570 by means of a SEL control lead. The output of selector 740 is an 8-bit bus which is connected to the parallel input of a serializer 780, whose output is connected to a second input of OR gate 790. Serializer 780 has a load input which is connected to the LOAD output of DMA1 CONTROL circuit 570 and also a clock input which receives a clock signal generated at the output of AND gate 4100.

Figure 3:
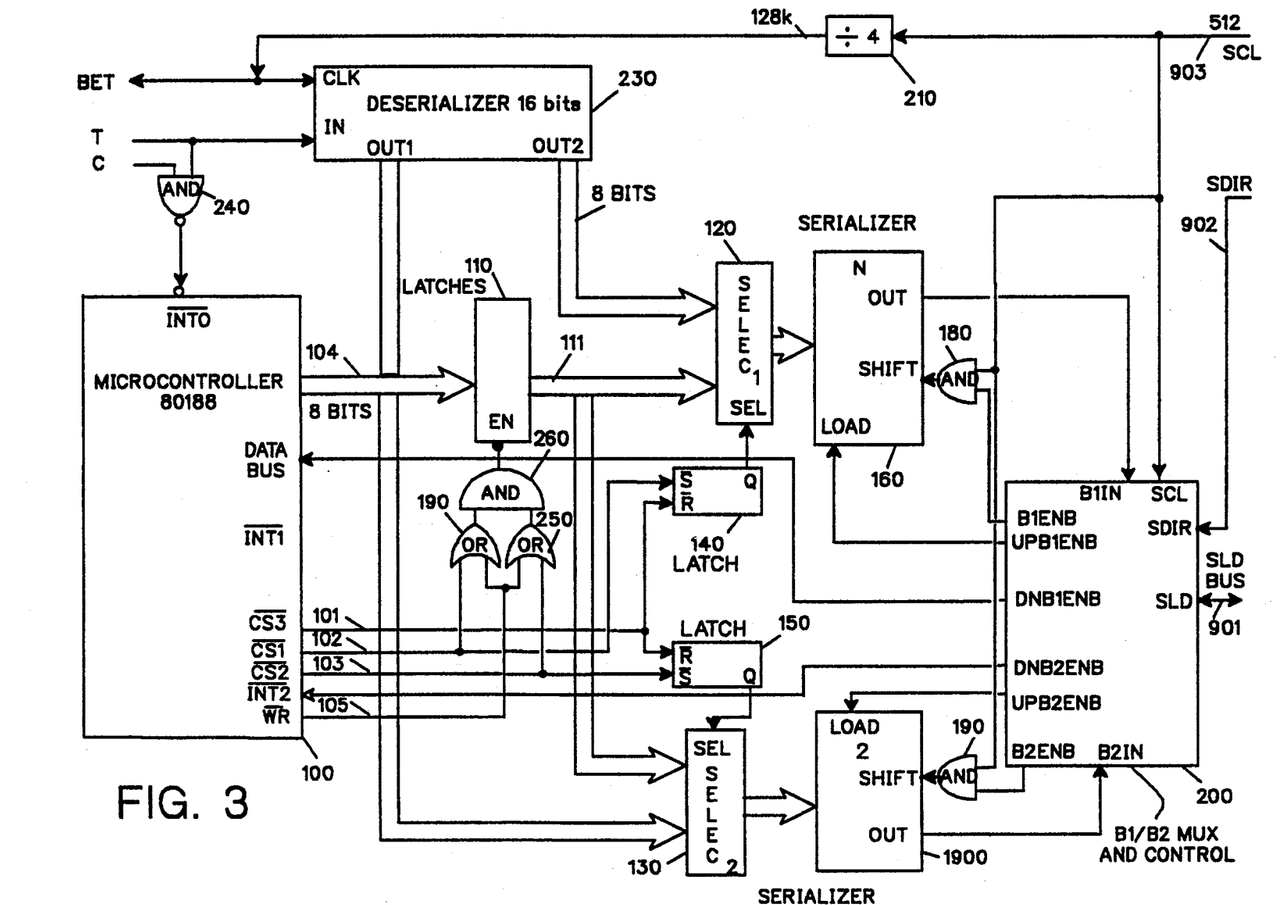
FIG. 3 illustrates the transmit part of a terminal adapter in accordance with the present invention.

The transmit part of the terminal adapter is illustrated in FIG. 3. Microcontroller 100 has its data bus 104 connected to the input bus of a latch 110, whose output bus 111 is connected to a first input bus of a selector 120 and also to a first input of a second selector 130. Both selectors 120 and 130 have their second input buses, respectively, connected to the eighth most significant bits and to the eighth least significant bits of a 16-bit deserializer circuit 230.

Deserializer 230 receives the serial data flow from the Data terminating equipment connected to the considered terminal adapter. If the DTE and the terminal adapter communicate through a X21 interface in accordance with the CCITT recommendation, then the data flow comes from the T lead. Deserializer 230 also receives a clock signal from a divide-by-4 circuit 210 receiving the SCL clock 901 at 512 kbps.

Microcontroller 100 has a set of three inputs. CS1 chip select lead 102, CS2 chip select lead 103 and CS3 chip select lead 101. CS1 lead 102 is connected to a first input of a OR gate 190 and to the Set input of a flip-flop 140. The CS2 chip select lead 103 is connected to a first input of OR gate 250 and to the Set input of a second flip-flop 150. The CS3 chip select is connected to both reset input leads of flip-flops 140 and 150.

The write output 105 of microcontroller 100 is connected to the second input of both OR gates 190 and 250. The outputs of the OR gates are connected to the two input leads of AND gate 260, whose output is connected to the enable input lead of octal D-type latch 110.

The "true" output of flip-flops 140 and 150 are, respectively, connected to the Sel input of selector 120 and to the Sel input of selector 130. Selectors 120 and 130 each have an output 8-bit bus which is, respectively, connected to the input bus of a first serializer circuit 160 and the input bus of a second serializer 1900.

Serializer 160 has an output which is connected to a B1 IN input of a B1/B2 MULTIPLEXING AND CONTROL circuit 200 which also receives at its B2 IN input lead the serial flow of data coming from the output of serializer 1900.

MULTIPLEXING AND CONTROL circuit 200 has an "UP B1 ENABLE" output lead which is connected to the LOAD lead of serializer 160 and also an "UP B2 ENABLE" output lead which connected to the LOAD lead of serializer 1900. MULTIPLEXING AND CONTROL circuit 200 has a "B1 ENABLE" output lead which is connected to a first input of a AND gate 180 having a second input which receives the 512 kbps SCL clock on lead 903 and whose output is connected to the shift input of serializer 160. Similarly, MULTIPLEXING AND CONTROL circuit 200 has a "B2 ENABLE" output lead which is connected to a first input of a AND gate 190 having a second input which also receives the 512 kbps SCL clock on lead 901 and whose output is connected to the shift input of serializer 1900.

MULTIPLEXING AND CONTROL circuit 200 receives the SDIR signal on lead 902, SCL signal on lead 903 and the SLD signal on lead 901 which are generated by ISDN interface controller 900 as explained above. MULTIPLEXING AND CONTROL circuit 200 has a set of two "DOWN B1 ENABLE" and "DOWN B2 ENABLE" leads which are, respectively, connected to the INT1 interrupt input lead and to the INT2 interrupt input lead.

The flow of data transmitted by the Data Terminating Equipment is also transmitted to a first input lead of a NAND gate 240 which receives a signal indicative of the start of the frame. In the case of a X21 interface, the latter signal corresponds to the signal carried on the C lead. The output of NAND 240 is connected to a INT0 interrupt lead of microcontroller 100. The divided clock signal available at the output of divide-by-4 circuit 210 is also used as the bit element timing required by the DTE.

B1/B2 Multiplexing and control circuit 200 has an output lead which is connected to SLD lead 901 which carries the multiplexed data coming from the two shift registers 160 and 1900.

The Terminal adapter in accordance with the present invention operates as follows:

The first step consists in the connection of the Terminal adapter—hereinafter referred to as a "calling terminal" adapter—to a second terminal adapter—hereinafter referred to as a "called terminal" adapter—through the Integrated Service Digital network. Such a connection is basically explained in I. 440 CCITT recommendations. Next, a specific initialization communication protocol is performed between the calling terminal adapter and the ISDN network and a called terminal adapter. That is to say, data are exchanged through the D channel in order to permit further communication. After this first step, both terminal adapters become capable of exchanging data through a first B channel from this instant onward.

As soon as one of the two B channels has been initialized and assigned during the first above step, to the calling terminal adapter, the calling adapter transmits a predetermined SDLC frame to the opposite terminal adapter. That SDLC frame consists, in the preferred embodiment of the invention, of one SDLC flag ('7E' in hexadecimal), followed by one specific byte characteristic of the B channel which has been associated to the latter terminal adapter. In the preferred embodiment of the invention, the three most significant bits of that byte characterizing the B channel are as follows: the three first bits are equal to '000' (in binary) when the B1 channel has been assigned and are equal to '100' when the B2 channel has been assigned. The latter byte could then be followed by the traditional Frame Checking Sequence (FCS) and also by the ending SDLC flag before being transmitted to the opposite terminal adapter through the ISDN network.

The transmission of this SDLC frame is achieved as follows: microcontroller 100 generates the above SDLC frame at the data bus 104 and activates CS1 chip select lead 102. Consequently, latch 110 is enabled and flip-flop 140 is set. The SDLC frame of data is generated in bytes at the data output bus of microcontroller 100 and then transmitted to the first input bus 111 of selector 120 via latches 110, and then to the input of serializer 160. When one byte is available at the input of serializer 160, the byte is loaded into it by means of a pulse issued from MULTIPLEXING AND CONTROL circuit 200 on "UP B1 ENABLE" lead and transmitted to the LOAD input of serializer 160. Therefore, Serializer 160 generates at its output a corresponding serial flow of data at the rate of the clock existing at its shift input lead.

This input clock is produced by means of the OR gate 180 receiving first the 512 kbps SCL clock on lead 903, and, second, an envelope signal on a lead "B1 ENABLE" generated by multiplexor 200, and which is high since the serial flow of data is to be transmitted through the B1 channel which was just initialized and assigned associated to the calling terminal adapter. MULTIPLEXING AND CONTROL circuit 200 transmits through the SLD bus lead 901 the SDLC frame in the appropriate B channel, which SDLC frame is transmitted by ISDN interface controller 900 of the calling terminal adapter to the ISDN network via transformer 1001 and connector 1000.

The called terminal adapter receives the SDLC frame and the receiving part included therein starts processing it as follows. The SDLC frame is received on SLD bus lead 901 via ISDN interface controller 900 by DEMULTIPLEXING circuit 300. DEMULTIPLEXING circuit 300 transmits the SDLC frame on one of the two "DATA IN B1" or "DATA IN B2" leads 302 and 301 in accordance with the B Channel which has been associated to the called terminal adapter by the ISDN network.

Let us assume that the ISDN network was assigned the called terminal adapter with the B1 channel for instance. The SDLC frame is generated at the "DATA IN B1" lead 302 and then transmitted to data input of CONTROL DECODER circuit 510, to the input of FLAG DETECTOR 400 and also to the input of DESERIALIZER 410. When FLAG DETECTOR 400 detects the opening SDLC flag, the latter generates a pulse to the IN input of CONTROL DECODER 510, indicating to the latter that the decoding of the bits that just follow the flag is requested. CONTROL DECODER 510 waits until the third bit that follows the opening flag is received and generates an output pulse at one among the 6 output leads which corresponds to the value of the three bits.

Since the calling terminal adapter was assumed to be assigned to the B1 channel, the called terminal adapter, and consequently DECODER 510 there included decodes the pattern '000' (in hexadecimal) and generates an output pulse on lead 511. The latter pulse is then transmitted to INT3 interrupt lead 531 of microcontroller 100 via NOR gate 530. The interruption which is generated causes microcontroller 100 to read the contents of deserializer 410. To achieve this, microcontroller 100 simultaneously generates an appropriate chip select on CS4 lead 106 and a read signal on lead 107. This causes OR gate 360 to transmit an enable pulse to the OC input of deserializer 410 via AND gate 2000 and also to the Output Control (OC) of tri-state buffer 340. Deserializer 410 validates its data bus 411 and generates its contents which are then transmitted to data bus 104 of microcontroller 100 through buffer 340.

When the called terminal adapter has identified the first SDLC frame, it initiates the transmission of a second SDLC frame of the same type to the calling terminal adapter. Similarly to the above, the transmitted SDLC frame includes a specific byte indicating which B channel was assigned to the called terminal adapter. More particularly, if the B1 channel was assigned, the called adapter transmits a byte whose most significant bits are equal to '010' just after the opening SDLC flag. On the contrary, if the B2 channel was assigned to the called terminal adapter, then the latter transmits a byte whose most significant bits are equal to '110'.

Let us assume that the called terminal adapter is also assigned the B1 channel by the ISDN network. It should however be noticed that those skilled in the art will easily and straightfowardly adapt the rest of the description to a case where the called adapter is assigned the B2 channel. The transmission process of the second SDLC frame in the called terminal adapter is the same as the transmission of the first SDLC frame which was described above.

When the calling terminal adapter receives the second SDLC frame, the initialization procedure or protocol for the first B channel completes and the calling terminal adapter is assured that a first B channel is actually operational in both directions. From this instant, the called terminal adapter waits for the establishment of the second B channel, which establishment entails a similar exchange of data as the above.

When both B-channels are assured to be actually operational, the calling and called terminal adapters can start transmitting and receiving data through those B-channels.

This transmission is initiated when the Data terminating equipment which is connected to the terminal adapter is informed of the establishment of the 128 kbps channel, for instance by the reception of the Ready For Data signal sent by the terminal adapter. In the CCITT X21 recommendations, the DTE sets to "Up" the C lead at the input of NAND 240, the T signal at the input of deserializer 230 being already Up. The terminal adapter receives from the data terminating equipment a flow of data at 128 kbps consisting in a sequence D1, D2, D3, D4, ... The terminal adapter, and more particularly deserializer 230, separates the latter flow into two distinctive flows at 64 kbps. A first flow of data D1, D3, D5, ... is generated at the first output of deserializer 230 and transmitted to the first input of selector circuit 130. Similarly, a second flow D2, D4, D6 ... is generated at the second output of deserializer 230 and transmitted to the first input of selector circuit 120. The actual transmission of the two flows of data however starts with the transmission on both B channels of a third SDLC frame consisting again of a opening flag, an identification byte, a FCS and, finally, the ending SDLC flag. This third identification byte has three most significant bits which are respectively equal to '011' if the B channel was assigned by the network to the calling terminal adapter and '111' in case of the B2 channel being assigned.

The data sent on each B channel all begin with the same pattern: the one corresponding to the channel which was the first assigned to the calling terminal equipment.

It therefore appears that the initialization protocol and the exchange of data between both terminal adapters is simply achieved as described above by means of the serializer and deserializer circuits included in both calling and called terminal adapters.

In every terminal adapter, the receiving part, and particularly circuit 9999, provides the overall synchronization of both B channels, although the ISDN network does not assure the same transmission delay to each. This synchronization is achieved as follows: the receiving part of one terminal adapter and particularly CONTROL AND DECODING circuits 510 and 610 waits for the occurrence of the above third synchronization SDLC frame. The occurrence of the third synchronization SDLC frame depends on the actual transmission delay introduced by the network. Let us assume that the B1 channel provides the shorter transmission delay. In that case, the decoder (among the two DECODING AND CONTROL decoders 510 and 610) which first decodes the above third synchronization pattern will be DECODING AND CONTROL decoder 510. The latter decoder thus decodes the occurrence of the pattern '011' in the three most significant bits of the byte which just follows the opening flag of the third synchronization SDLC frame.

This decoding causes OR gate 520 to generate a pulse which is transmitted to the ENABLE input of counter 540, to the START input of DMA1 CONTROL circuit 570 and, finally, to the RESET input of latches 560.

Counter 540 starts running from '0000' in hexadecimal at the rate of the byte clock on lead 3210 which is generated by clock generator 320. It should be noted that the byte clock is the result of a division by eight of the bit clock extracted from SCL clock lead 903. The bytes which are deserialized by deserializer 410 are then directly and sequentially stored into RAM storage 580 via DMA1 CONTROL circuit 570 at the addresses which are generated at the incrementing output of counter 540.

The sequence of data bytes which are received by the terminal adapter on the B1 channel, and which are comprised in the successive SDLC frames which follow the above third synchronization SDLC frame which included the above identification byte ('011' in hexadecimal), is sequentially stored in RAM 580 from the location '0000', this storing process being pulsed by the byte clock.

This sequential loading of data into RAM 580 continues until the reception of the pattern '111' on B2 channel which is decoded by DECODING AND CONTROL circuit 610 indicating that the sequence of data D2, D4, D6 is available on the B2 channel. Upon detection of this pattern, CONTROL and DECODING circuit 610 raises to a high level lead 615 at the input of OR gate 620. OR gate 620 transmits a corresponding high level to the LOAD input of latches 560. The latches 560 are loaded with the current address value generated by counter 540. Since both input busses of comparator 550 carry at this instant the same digital value, comparator 550 generates a pulse which is transmitted on lead 551 to the load input of counter 540.

From this instant onward, counter 540 is preloaded with the values existing on its D0-D3 input leads 545. That is to say, is reset to zero. The high level existing at the output of OR 620 is also transmitted to the ENABLE input of DMA1 circuit 570. As soon as the first byte Dn in the B1 channel, which just follows the third synchronization SDLC frame received on B2 channel, the first byte included in the data field of the SDLC frame that follows the latter SYNCHRONIZATION frame, DMA1 CONTROL performs a READ operation of the contents of RAM storage 580 at the address generated by counter 540, that is to say '0000'. The data which appears on the data bus 104, and which was previously loaded into RAM 580, consisting of D1, D3, D5, etc., transmitted through the B1 channel, is transmitted to latch 720 which is enabled by DMA1 CONTROL circuit 570 which has generated a pulse on its READ lead 571. The sequence of bytes D1, D3, D5, etc., is then transmitted to the 8-bit input bus of selector 740, whose SEL input lead is set to a high level by DMA1 CONTROL circuit 570, and then transmitted to the 8-bit input bus of serializer 780. Since the LOAD input lead of the latter is also set to a high level by DMA1 CONTROL circuit 570, serializer 780 generates the sequence of bytes D1, D3, D5, etc., in series at the rate of the clock existing at its input lead and generated by AND 4100.

That clock includes a burst of 8 elementary bit clock pulses since the first input of AND gate 4100 receives the B1 ENV envelope signal of B1 which is generated by B1/B2 demultiplexing circuit 300 while the second input lead of AND gate receives the bit clock which is generated by clock generator 320. When the byte D1 that was stored into location '0000' has been stored into latch 720, DMA1 CONTROL circuit 570 causes the following byte Dn which appears at the output bus of deserializer to replace the previous byte D1 and to be loaded into RAM 580 at the address location '0000'.

To achieve this, DMA1 CONTROL circuit generates a low level at its WRITE output lead 572 simultaneously with a chip-select signal on lead 573, which results in a pulse transmitted to the input of AND gate 2000 via OR gate 590. As shown above, the next bytes will be cyclically, sequentially stored from that location '0000' to the location defined by the contents of latch 560 at the rate of the byte clock which is transmitted from clock generator 320 to the clock input of counter 540. Parallely, DMA1 CONTROL circuit performs the reading of the RAM 580 at the rate of the same byte clock which is received at its input lead. Data which are transmitted through the B1 channel and which are extracted from storage 580 are transmitted via OR gate 790 to the data terminating equipment connected to the terminal adapter at 64 kbps.

Reconsidering again the instant when the '111' signal was decoded by CONTROL and DECODING circuit 610, the high level appearing at the output of OR gate 620 is transmitted to the ENABLE input of counter 640 which starts counting at the rate of the byte clock on lead 3110 and generated by CLOCK GENERATOR 310. Consequently, DMA2 CONTROL circuit 670 generates as set of READ and WRITE control signals to RAM storage 680, the READ signal being prior to the WRITE signal. In synchronism with the byte clock existing on lead 3110, DMA2 CONTROL circuit 670 performs a READ operation of the storage at the address specified by counter 640. The contents of location at address '0000', including the '7E' SDLC flag at the beginning of the transmission on the B2 channel, are then transmitted and stored into latch 710 since the ENABLE input of the latch has been activated by DMA2 CONTROL circuit 670. Then, a WRITE operation is performed by DMA2 and CONTROL circuit 670 into the location at the address '0000': the first byte of the sequence of bytes which is transmitted through the B2 channel is stored into location '000'. The occurrence of the next byte clock pulse on lead 3110 causes counter 640 to be incremented. However, since the contents of latch 1000 is loaded with the value '0000' (the only latch among the two latches 560 and 1000 which are loaded with a value which is not equal to zero is the latch which corresponds to the B channel which has the lower transmission delay), the output of comparator 650 remains at a high level, which prevents its incrementation. Consequently, DMA2 CONTROL circuit 670 causes each byte of the flow of bytes transmitted through the B2 channel to be sequentially loaded into location '0000' in storage 680 and then unloaded in order to be transmitted to serializer 770.

Because of the existence of the B2 and B1 envelope signals on leads 303 and 304 which are transmitted to the clock input of serializers 770 and 780 via AND gates 4101 and 4100, the serializers interleave the two sequences of bytes D1, D3, D5, . . . and D2, D4, D6, D8, . . . in order to create again a continuous flow of ordered bytes D1, D2, D3, D4, . . . It therefore appears that the output of OR gate 790 generates a continuous flow of data at 128 kbps which alternatively comprises one byte coming from the B1 channel and one byte coming from the B2 channel, both B channels being thus re-synchronized in phase.

Figure 4:
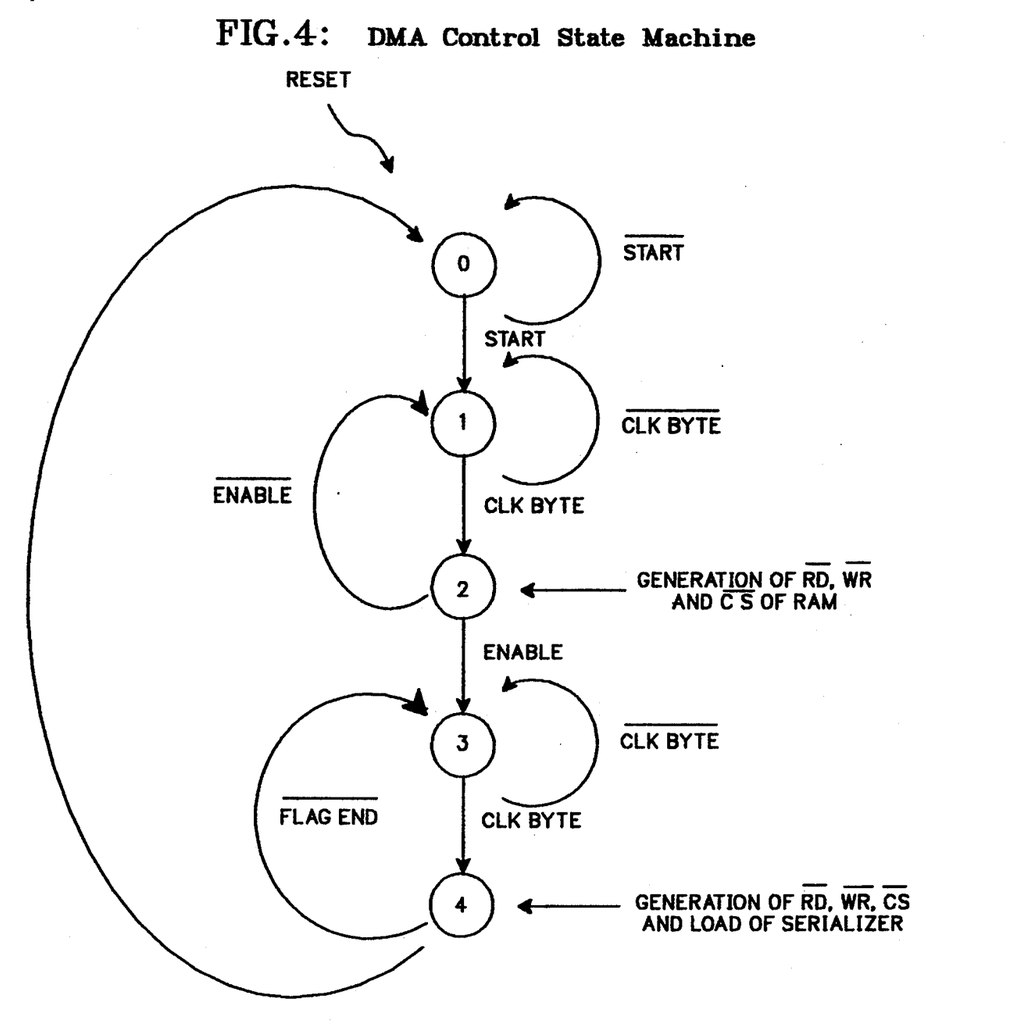
FIG. 4 is a flow chart illustrating the Direct Memory Access (DMA) control state machine diagram.
Figure 5A:
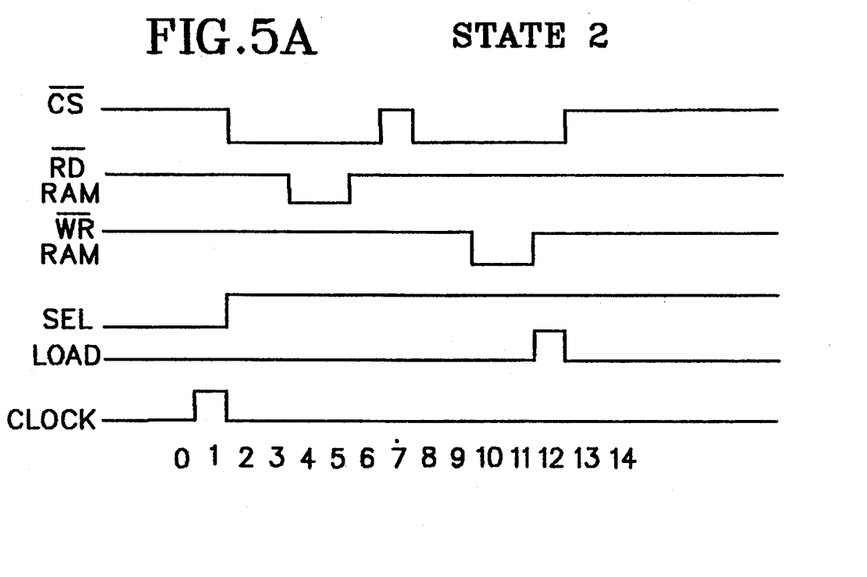
FIGS. 5a and 5b are timing diagrams illustrating the output of the DMA control circuit.
Figure 5B:
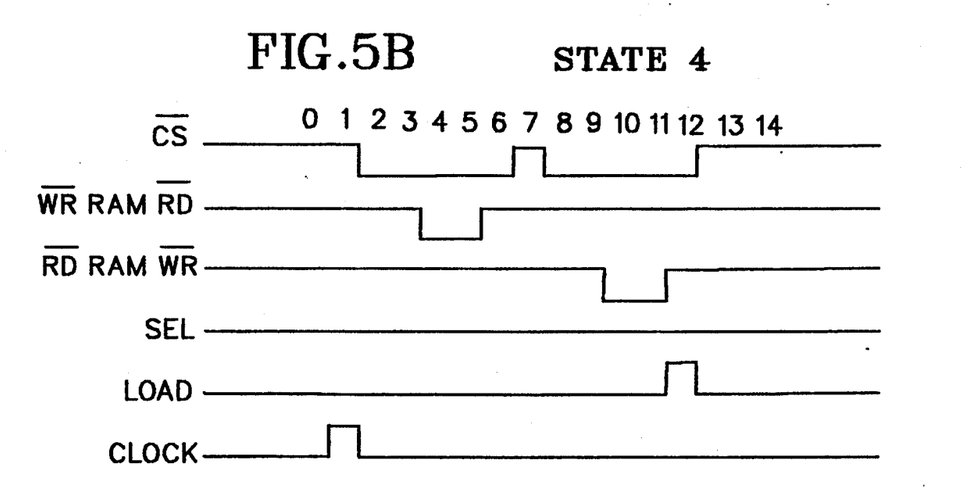
Figure 6:
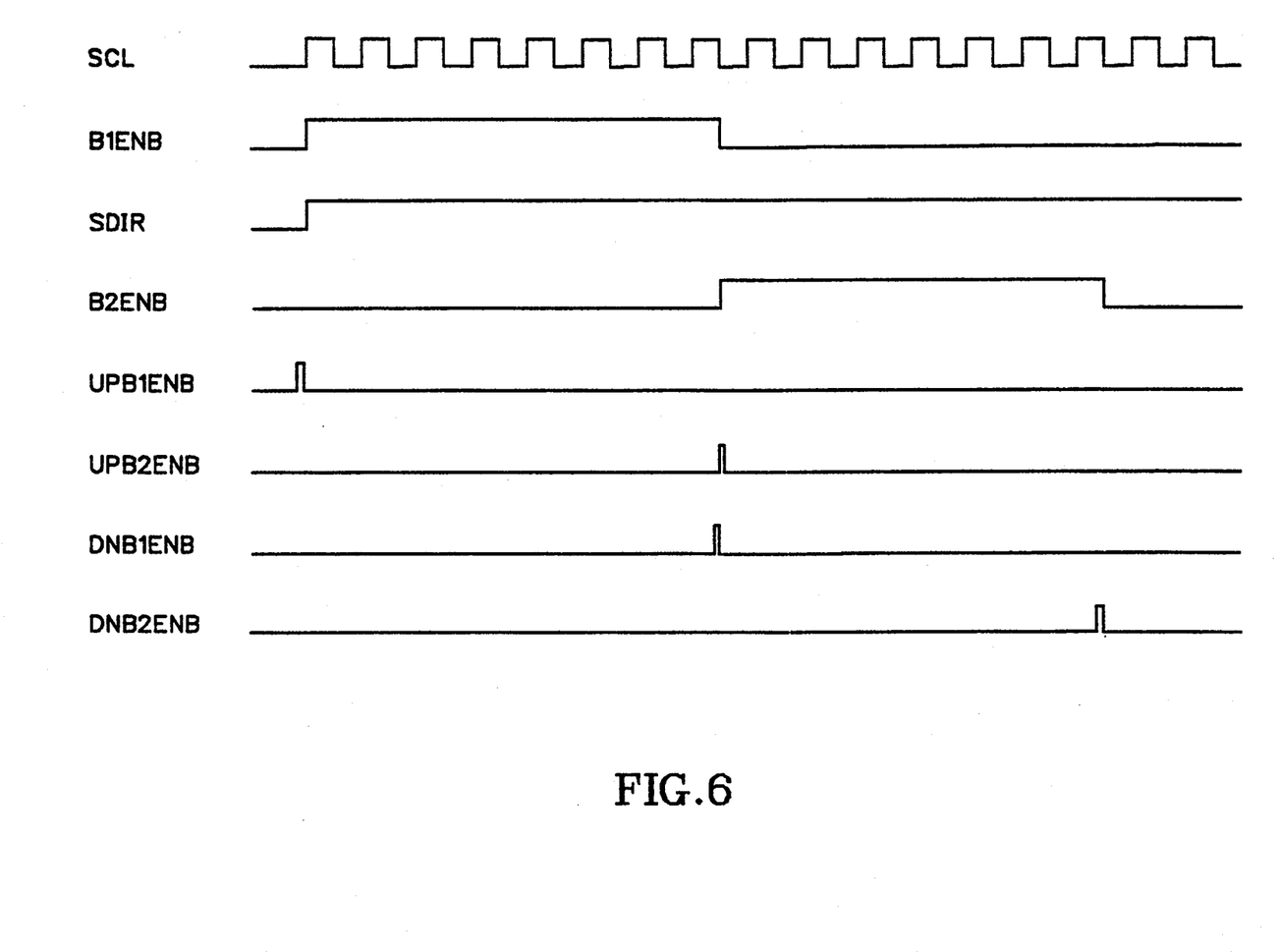
FIG. 6 is a timing diagram of basic signals in the transmit part.

Illustrative timings of signal existing at the output of DMA1 CONTROL circuit 570 are shown in FIGS. 5A and 5B while the description of the state machine of the latter circuit is shown in FIG. 4.

After reading the byte loaded into the '0000' location by DMA1 CONTROL circuit 570, DMA1 CONTROL circuit 570 waits for the next byte.

A timer is implemented in microcontroller 100 of the terminal which ensures that both B-channels are established and operational within a predetermined period. If the second B channel is not available at the end of that period, microcontroller 100 causes the disconnection of the first B channel and informs the application program that the connection was not successful.

Moreover, an overflow detecting apparatus is included into the terminal adapter which ensures that counters 540 and 640 do not overflow, which would lead to a loss of data received from the network. In that case, microcontroller 100 causes disconnection of both B-channels.

It should be noticed that the invention can be used in a terminal adapter having more than two channels. In particular, the invention can be embedded into multiple basic terminal adapter's primary access. This will be achieved by using as many of circuits 9999 as the number of channels to be multiplexed. Moreover, those skilled in the art will easily adapt the structure of DECODING AND CONTROL circuits 510, 610, etc . . . so that they decode more than the three most significant bits of the identification byte (s).

Finally, it should be noticed that a unique RAM storage, a unique DMA CONTROLLER 570, and a unique COUNTER 540 can be multiplexed in order to simplify the structure of the terminal adapter in case of a single 128K channel using 2B channels. This is made possible since only the circuit 9999 corresponding to the first B channel which is assigned to the terminal adapter is fully used.

The completion of the initialization protocol for the second B channel which is assigned to both calling and called terminal adapters will now be described.

More particularly, when the remaining B channel is assigned to the calling terminal adapter, ISDN interface controller 900 raises an interrupt to microcontroller 100 indicating to the latter that the second B channel (that is to say the B2 channel since the first B channel was assumed to be the B1 channel) was assigned to it. Then, microcontroller 100 generates a first B2 SYNCHRONIZATION SDLC frame comprising again a SDLC opening flag, an identification byte which the first three most significant bits will be decoded, a Frame Checking Sequence and a closing flag. Similarly to the above, the identification byte depends on which B channel was assigned to the terminal adapter. Since the second B channel which is now assigned to the calling terminal adapter is the B2 channel (the B1 channel has already been assigned in our assumption), then the identification byte has the first three most significant bits which are equal to '000'.

The generation and the transmission of this B2 SYNCHRONIZATION frame is achieved as described above by means of serializer 160, and the B1/B2 multiplexing circuit 200. When the called terminal adapter has identified the fist B2 SYNCHRONIZATION SDLC frame, the latter initiates the transmission of a second B2 SYNCHRONIZATION SDLC frame which has the same structure as above. That is to say, the structure includes an opening SDLC frame, and a specific byte indicating the nature of the remaining B channel which was not yet assigned to the called terminal adapter. Since the remaining channel was the B2 channel, the called terminal adapter transmits a byte whose most significant bits are equal to '110'. The transmission process of the second SYNCHRONIZATION SDLC frame in the called terminal adapter complies with the above description.

When the calling terminal adapter receives the second SYNCHRONIZATION SDLC frame, it sends back a third SYNCHRONIZATION SDLC frame consisting again of a opening flag, and an identification byte whose three most significant bits are equal to '111' since the B2 channel has just been assigned to it.

Upon reception of this third SYNCHRONIZATION SDLC frame, the initialization procedure or protocol for the second B channel completes and the calling terminal adapter can start transmitting data through the B channel which was assigned to it; that is to say, transmitting SDLC frames including data through the B2 channel in our assumption.

The invention is particularly well suited for the transmission of multimedia data. Indeed, since multimedia data includes voice, image, video, fax and conventional data, a problem in the prior art consists in how to provide an appropriate set of channels having multiple transmission rates while the common ISDN network only provides a double 64 kbps B channel. Thus, for transmitting both voice and video, the traditional solution consists in allocating a first B channel for the voice and a second B channel for the video. However such a solution appears in some cases not to be well suited for transmitting either voice or data. A 64 kbps channel is not sufficient for transmitting high definition images while the same rate appears to be higher than necessary for the transmission of voice.

The terminal adapter according to the present invention solves this problem by providing a division of the 128 kbps single channel into adaptable sub-channels which have the appropriate size. In a preferred embodiment of the invention, the single 128 kbps channel is divided in order to generate a first 112 kbps channel available for high definition video data and a 16 kbps channel which is available for the transmission of voice. This is achieved by separating a set of 16 bits, consisting in the association of a first byte transmitted through the B1 channel and a second byte which is transmitted through the B2 channel. The 16 bits are divided in a set of 14 bits which are used for the video and the remaining two bits for the voice.

It should however be noted that the invention can be used in order to provide a set of two distinct normal 56 kbps video channels instead of a single high definition 112 kbps video channel. More generally the 16 bits which are transmitted through B1 and B2 channels can be split in two distinct parts, the size of which being chosen according to the user requirements in order to provide the desired transmission rate.

We claim:

1. Apparatus for connecting data communicating equipment to a digital communication network providing at least first and second digital communication channels, said first channel having a first transmission delay and said second channel having a second transmission delay, said apparatus comprising:

a transmit part comprising:

means for separating a single high rate data signal received from said data communication equipment into two distinct low rate data signals, each of said low-rate data signals being transmitted through a different one of said digital channels, and means for adding to each low rate signal a unique identifier characterizing the associated digital channel;

a receive part comprising:

storage means for storing the data received from said digital network, means for measuring the difference between the two transmission delays, addressing means for addressing said storage means in order to extract the data received through both digital channels, detecting means for detecting the reception of said identifiers which are received from said digital network, and control means responsive to the reception of said identifiers and the difference between said transmission delays for controlling said addressing means in order to provide a high-rate data signal which is not affected by the difference in transmission delays introduced by both digital channels.

2. Apparatus according to claim 1 wherein said receive part further comprises:

counting means starting counting on the detection of the first detected identifier and which is reset on the detection of the occurence of the second identifier for generating a successive sequence of addresses, means for storing the succession of data received from the digital channel having the lower transmission delay into said storage means at the addresses generated by said counting means, and means active on the detection of the second identifier for providing a high rate sequence of data consisting of the alternation of one byte extracted from said storage means and one byte which is received from the slower digital channel in order to provide a fully synchronized high rate data signal.

3. Apparatus according to claim 2 further comprising means for performing an initialization procedure to indicate to said data communication equipment that both of said first and second digital channels are operational.

4. Apparatus according to claim 3 further comprising timing means for measuring the delay between establishment of two of said first and second digital channels, and means for disconnecting either said first or second channel as an already established digital channel in the case where the measured delay is greater than a predetermined level.

5. Apparatus according to claim 4 further comprising overflow detecting means for disconnecting said first and second digital channels in a case where an overflow of said storage means is detected.

6. Apparatus according to one of claims 1 to 5 characterized in that it consists in a terminal adapter for a ISDN network allowing the establishment of a fully synchronized 128 kbps data communication link.

7. Apparatus according to claim 6 characterized in that it includes means for performing a time division multiplexing process of a 128 kbps data signal in order to provide a set of different digital channels having adaptable data transmission rate for simultaneously transmitting data, video and voice.

* * * * *